United States Patent

Ookouchi et al.

[11] Patent Number: 5,718,519
[45] Date of Patent: Feb. 17, 1998

[54] CONTINUOUS HOT DIPPING APPARATUS AND SLIDE BEARING STRUCTURE THEREOF

[75] Inventors: Takahiko Ookouchi; Tamihito Kawahigashi, both of Katsuta, Japan

[73] Assignee: Hitachi, Ltd., Tokyo, Japan

[21] Appl. No.: 588,777

[22] Filed: Jan. 19, 1996

Related U.S. Application Data

[62] Division of Ser. No. 020,783, Feb. 22, 1993, Pat. No. 5,538,558.

[30] Foreign Application Priority Data

Feb. 20, 1992 [JP] Japan ................. 4-033118

[51] Int. Cl.$^6$ .................. F16C 19/22; F16C 19/40
[52] U.S. Cl. .................. 384/569; 384/551; 384/907.1
[58] Field of Search .................. 384/492, 520, 384/551, 569, 907.1; 118/419, 420

[56] References Cited

U.S. PATENT DOCUMENTS

| | | | |
|---|---|---|---|
| 4,634,300 | 1/1987 | Takebayashi et al. | 384/569 X |
| 4,770,549 | 9/1988 | Rokkaku et al. | 384/907.1 X |
| 5,040,906 | 8/1991 | Zornes | 384/551 |
| 5,072,689 | 12/1991 | Nakagawa et al. | 118/419 |
| 5,252,130 | 10/1993 | Ookouchi et al. | 118/423 |

FOREIGN PATENT DOCUMENTS

| | | |
|---|---|---|
| 0296291 | 12/1987 | European Pat. Off. . |
| 0339338 | 4/1989 | European Pat. Off. . |
| 0346855 | 6/1989 | European Pat. Off. . |
| 0365178 | 10/1989 | European Pat. Off. . |
| 1129796 | 5/1962 | Germany . |
| B-2643958 | 9/1976 | Germany . |
| 0127510 | 6/1987 | Japan . |
| 3145820 | 6/1988 | Japan . |
| 1-159359 | 6/1989 | Japan . |
| 2153055 | 6/1990 | Japan . |
| 3020115 | 1/1991 | Japan . |
| 3177552 | 8/1991 | Japan . |

*Primary Examiner*—Thomas R. Hannon
*Attorney, Agent, or Firm*—Antonelli, Terry, Stout & Kraus, LLP

[57] ABSTRACT

A slide bearing fashioned as a ball bearing or a roller bearing, wherein contact portions of a roll shaft and a bearing, and rolling elements are formed of a combination of a ceramic material and a solid lubricant material. The slide bearing is advantageously utilized in a continuous hot dipping apparatus in which ball bearings or roller bearings are used as bearings of a sink roll and guide rolls of the apparatus.

2 Claims, 9 Drawing Sheets

CONTINUOUS HOT DIPPING APPARATUS AND SLIDE BEARING STRUCTURE THEREOF

This application is a division of application Ser. No. 08/020,783 now U.S. Pat. No. 5,538,558, filed Feb. 22, 1993.

FIELD OF THE INVENTION

The present invention relates to a continuous hot dipping apparatus and, more particularly, to a roll bearing device for a continuous hot dipping bath which bearing device has excellent properties against corrosion by molten metal, wear due to a load from a roll shaft, and to a sink roll, a guide roll, a bearing and a slide bearing structure for use in this device.

BACKGROUND OF THE INVENTION

A roll bearing for a continuous hot dipping bath has generally been fashioned of a stainless steel, high-chromium steel, sintered carbide etc., having excellent properties with respect to corrosion resistance, and being formed through build-up welding or a sleeve type construction. However, these materials wear and can be damaged, for example, after about one week of immersion in a hot zinc dipping bath. As a result of the damage, a play results between a roll shaft and the roll bearing, and a roll and a hot dipping apparatus will oscillate, thereby adversely affecting the overall plating process.

It has been found that it is difficult to completely prevent corrosion of a metal due to molten metal even if the metal employed is relatively excellent with respect to corrosion resistance, for example is a metal such as stainless steel, high-chromium steel or sintered carbide. Consequently, corrosion wear due to molten metal as well as friction is caused at the time of sliding of the roll bearing, thus increasing the wearing depth. It has also been determined that, when corrosion reaches a certain stage, corrosion pits are formed in the sliding surfaces of the roll shaft and bearing thereby promoting additional wear due to friction.

In order to decrease the wearing of the roll bearing, it is necessary to select a material which is excellent in corrosion resistance against molten metal. In this connection, some ceramics exhibit little corrosion due to molten metal, and such ceramics can be regarded as the optimum material for a roll bearing for a hot dipping bath.

In, for example, JP-A-3-177552, a bearing for a continuously operating hot dipping bath is proposed wherein a sintered ceramic member is closely fitted on the outer peripheral surface of a roll shaft through a metallic buffer material, and a solid lubricative ceramic material is provided on an inner peripheral surface of the bearing. Additional rolling bearings are proposed in JP-A-2-153055 and JP-A-1-159359, which bearings are fashioned of a ceramic material.

A disadvantage in the above proposed conventional approaches results in the fact that no consideration is given to a specific combination of the ceramic and necessary solid lubricant during actual operation in the continuous hot dipping bath.

In other words, it has been determined that although ceramics are excellent in corrosion resistance against molten metal, a new problem arises in that intermetallic compounds generated as a result of a reaction between the molten metal and metallic construction elements, such as a roll and a bearing, immersed in the molten metal adversely affect the solid lubricant.

SUMMARY OF THE INVENTION

An object of the present invention resides in providing a continuous hot dipping apparatus in which a combination of a ceramic and a solid lubricant member is employed as a slide bearing structure of a bearing and a shaft so as to enhance corrosion resistance and wear resistance, thereby increasing the durability, and of the slide bearing in providing a sink roll, a guide roll, a bearing and a slide bearing structure for use in the dipping apparatus.

According to the present invention, a continuous hot dipping apparatus is provided which includes at least one roll supported by a bearing and rotated in a molten metal bath. The bearing may, for example, be a rolling bearing such as a ball bearing or a roller bearing, in which a contact surface of a roll shaft of the roll and the inner surface of the bearing relatively move through rolling elements, and the contact surface of the roll shaft and the inner surface of the bearing, and the rolling elements are fashioned of a solid lubricant member and a sintered ceramic member.

According to the present invention, a continuous hot dipping apparatus includes a sink roll and guide rolls supported and rotated in a molten metal bath. A bearing of at least one of the sink roll and the guide rolls is fashioned as a ball bearing or a roller bearing in which a contact surface of a shaft of the roll and the inner surface of the bearing relatively move through rolling elements, with the entire outer periphery of the roll shaft contact surface and the bearing surface being formed of solid lubricant members, and the rolling elements being formed of sintered ceramic members.

In accordance with further feature of the present invention, a hot dipping apparatus includes a sink roll and guide rolls which are supported and rotated in a molten metal bath, wherein an entire outer periphery of the contact surface of a shaft of the sink roll is formed of a sintered ceramic member, with the contact surface of a bearing of the sink roll being formed of an integral solid lubricant member having at least an arcuate shape, preferably, a semicircular or circular shape. The contact surface of a roll shaft of each of the guide rolls is formed of a solid lubricant member, and the guide roll bearing is a ball bearing or a roller bearing in which the roll shaft contact surface and the contact surface of the bearing relatively move through rolling elements. The bearing contact surface is formed of a solid lubricant member, and the rolling elements are formed of sintered ceramic members.

In accordance with the present invention, a roll, for example, a guide roll for a continuous hot dipping apparatus is fashioned of a heat resistant steel consisting essentially of, by weight, 0.15 to 0.30% C, not more than 2% Si, not more than 2% Mn, 20 to 30% Cr, 10 to 20% Ni, and balance of not less than 60% Fe, and a cylindrical solid lubricant member closely fitted over an entire periphery of the contact surface of the roll with respect to a bearing.

A high-temperature roll, for example, a roll for a continuous hot dipping apparatus according to the present invention includes a roll body and an integrally formed shaft with a cylindrically-shaped solid lubricant member being closely fitted, through a metallic buffer material, on the outer periphery of a cylindrical metal seat secured on the shaft.

According to the invention, a rolling bearing, especially a ball bearing or a roller bearing is proposed wherein the entire periphery of the inner surface of the bearing supported on a metallic seat is formed of a solid lubricant material, with a plurality of rolling elements being provided between the inner surface and a shaft which rotates in the bearing. The rolling elements are formed of sintered ceramic members, and intermediate members of a solid lubricant material are interposed between the rolling elements adjacent to one another.

In a roller bearing for a continuous hot dipping apparatus of the present invention, an entire outer periphery of the inner surface of the bearing is supported on a seat made of a heat resistant steel consisting essentially of, by weight, 0.15 to 0.3% C, not more than 2% Si, not more than 2% Mn, 20 to 30% Cr, 10 to 20% Ni, and balance of not less than 50% Fe, with the roller bearing being formed of a solid lubricant member. Cylindrical rolling elements, formed of sintered ceramic members, are provided between the bearing inner surface and a shaft rotated in the bearing, with intermediate members of a solid lubricant material being interposed between the rolling elements adjacent to one another.

According to the invention, a bearing structure is provided for a roll rotatably supported by a bearing, with the bearing being a rolling bearing, especially, a ball bearing or a roller bearing, in which the contact surface of a roll shaft of the roll and the inner surface of the bearing relatively move through rolling elements, and the roll shaft contact surface and the bearing inner surface are formed of a solid lubricant material, and the rolling elements are formed of a sintered ceramic material.

Preferably, in accordance with the invention, the sink roll or the guide rolls are made of a heat resistant alloy, with a cylindrical sintered ceramic member, which is integral or divided into a plurality of sections in the axial direction, being fitted and secured on the entire contact surface of a roll shaft of the sink roll. The roll shaft and a roll body of the sink roll is an integral structure, and a portion of the roll shaft which is connected to the roll body has a moderate curvature and a larger diameter than a portion of the roll shaft on which the sintered ceramic member is closely fitted. A metallic ring is provided between the cylindrical sintered ceramic member and the roll body.

According to the invention, at least one of the sink roll and the guide rolls is made of an Fe—, Ni— or Co-alloy system whose Cr content is 20% by weight or more, and a ring formed of a sintered ceramic material, which is integral or divided into a plurality of sections in the axial direction, is fitted and secured on the entire contact surface of the roll shaft.

In accordance with still further feature of the invention, the slide-contact portion of the bearing of the sink roll has a semicircular or circular shape, with an entire periphery of the semicircular or circular portion being formed of a sintered ceramic member or a solid lubricant member. The sintered ceramic member or the solid lubricant member is fitted and secured on a metallic base, and a contact surface of the member is projected from an inner surface of the metallic base and contacts the contact surface of a roll shaft of the roll so that the roll shaft contact surface and the bearing slide-contact surface move relatively in planar contact.

Advantageously, according to the invention, a sink roll or a guide roll for a continuous hot dipping apparatus is made of a heat resistant steel consisting essentially of, by weight, 0.15 to 0.30% C, not more than 2% Si, no more than 2% Mn, 20 to 30% Cr, 10 to 20% Ni, and balance of not less than 60% Fe, and includes a cylindrical sintered ceramic member, integral or divided into a plurality of sections in the axial direction which, fitted and secured on the entire periphery of the contact portion of the roll shaft with respect to a bearing.

Preferably according to a sink roll bearing of the invention, the inner surface of a metallic base of the bearing has a semicircular or circular shape, with a sintered ceramic member or a solid lubricant member being fitted and secured on the entire periphery of the inner surface. The contact surface of the member projects from the inner surface of the metallic base.

According to the invention, a bearing for a continuous hot dipping apparatus, when the inner surface of a metallic base of the bearing is of a heat resistant steel consisting essentially of, by weight, 0.15 to 0.30% C, not more than 2% Si, not more than 2% Mn, 20 to 30% Cr, 10 to 20% Ni, and balance of not less than 50% Fe, the bearing has a semicircular or circular shape, with a sintered ceramic member or a solid lubricant member is fitted and secured on the inner surface, and with the contact surface of the member projecting from the metallic inner surface.

Advantageously, according to the invention, a metal which constitutes the bearing and the roll and a metal which supports the bearing are a heat resistant steel consisting essentially of, by weight, 0.15 to 0.30% C, not more than 2% Si, not more than 2% Mn, 20 to 30% Cr, 10 to 20% Ni, and balance not less than 50% Fe.

Preferably, a composite graphite member containing carbon fibers having a bending strength of 10 $kg/mm^2$ or more is fitted and secured on the inner surface of the sliding portion of the bearing or the slide-contact portion of a roll shaft of the roll.

According to the invention, a slide bearing structure in which a sintered ceramic member or a metal and a solid lubricant member more relatively in contact, is preferable in the case where the solid lubricant member is formed of a composite graphite member containing carbon fibers, and the carbon fibers are orientated in such a direction that the longitudinal direction intersects with the slide-contact surface.

According to the invention, with a slide bearing structure for a roll rotatably supported by a bearing preferably a cylindrical sintered ceramic or solid lubricant member is closely fitted on the entire periphery of the surface of a roll shaft of the roll with the roll being an integral structure comprising a body and the roll shaft. A portion of the roll shaft connected to the body has a slight or moderate curvature and a larger diameter than the roll shaft on which the sintered or solid lubricant member is closely fitted, and a metallic ring is provided between the sintered or solid lubricant member and the body.

According to the invention, a sliding member is provided wherein fibers are dispersed in one direction in a solid lubricant member, with the fibers having a higher hardness or strength than the solid lubricant member. Preferably, the longitudinal direction of the fibers intersects the slide-contact surface.

According to further feature of the invention, a sliding member may be provided in which carbon fibers are dispersed in one direction in graphite, and, preferably, the longitudinal direction of the carbon fibers intersects the slide-contact.

The shaft sliding portion of the roll, in accordance with the present invention, is formed of a composite member including a ceramic and a metallic members which are fitted with each other and an intermediate stress buffer material, elastoplastically deformable by a force less than a rupture strength of the ceramic, is interposed between the ceramic and metallic members, so that an elasto-plastic deformation of the intermediate material is caused at least at a temperature at which it is used. Moreover, the elasto-plastic deformation of the intermediate stress buffer material is caused due to a thermal expansion difference between the ceramic and metallic members, with the intermediate stress buffer material being located with a residual space to which it can be deformed to move. The ceramic member is securely fixed on the metallic member which is the roll shaft or a metallic base.

Furthermore, preferably, the shaft contact portion of at least one of the sink roll and the guide rolls is formed of a composite member including a ceramic and a metallic members which are fitted with each other, and an intermediate material is provided between these fitted members in substantially the same manner as described above, the metallic member being the roll shaft or a metallic base. The intermediate material is located with a residual space to which the intermediate material can be elastoplastically deformed to move due to a thermal expansion difference between the both members at least at a temperature at which it is used, and thereafter the both members are fitted with each other.

According to the method of the present invention, in a hot dipping system the method includes moving a steel strip at high speed, continuously annealing the steel strip, bending the steel strip by a sink roll and guiding the steel strip straight by guide rolls in a molten metal bath, forming coating layers of the molten metal thereon, moving the steel strip vertically upwardly, injecting a gas at a high speed toward the coating layers on the steel strip moving vertically upwardly so as to control a thickness of the coating layer of the steel strip and provide a uniform thickness, and continuously producing plated steel sheets by using steel strips of the same type and using the same plating composition. The slide-contact surface of a roll shaft of the sink roll and the slide-contact surface of a bearing are formed of a combination of a solid lubricant member and a sintered ceramic member, with the lubricant member and the ceramic member being in planar contact with each other. Each of the guide rolls is supported by having and a ball bearing or a roller bearing having in which the slide-contact surface of a roll shaft of the roll and the slide-contact surface of the bearing are formed of solid lubricant members, with the guide rolls being substantially self-rotated by movement of the steel strip, so that oscillation of the steel strip, moving at high speed immediately after plating, is substantially eliminated for at least two days, and with tension, applied in a moving direction of the steel strip, being maintained at a substantially constant value, and with the gas injection being maintained in a substantially constant condition.

According to the invention, the slide-contact surface of a roll shaft of the roll and the slide-contact surface of a bearing are formed so that oscillation of the steel strip, moving at high speed immediately after plating, can be substantially eliminated, and the tension applied in a moving direction of the steel strip can be continuously maintained at a substantially constant value for at least two days, and layers of a substantially uniform thickness can be continuously plated on steel sheets comprising steel strips of the same type and coating layers of the same plating composition during a continuous operation.

Further, in the present invention, the gas injection can be maintained in a substantially constant condition for at least two days so as to uniformly form coating layers having a thickness varying from 10 to 50 μm, and it is possible to continuously produce plated steel sheets comprising steel strips of the same type and layers of the same plating composition.

In accordance with the present invention, in processing steel strips of the same type and layers of the same plating composition, preferably a roll shaft and a bearing are constructed in substantially the same manner as described above so that wear is substantially prevented, and oscillation of the steel strip, running at high speed immediately after plating, is detected for automatic control such that tension applied in a moving direction of the steel strip and a condition of the gas injection will be maintained so as to be substantially constant.

When the length of time of continuous production is increased, the productivity is higher. However, as the length of time of the continuous production is increased, the quality of products may gradually deteriorate. However, with the present invention, it is possible to perform continuous production for about thirty days.

According to the present invention, hot dipping may be continuously carried out for at least two days. During the continuous operation, it is possible to obtain steel strips whose plating thickness is not more than 50 μm and substantially uniform such that variation from a desired thickness is 5 μm or less.

With the present invention, plating layers of various thickness of 2 to 10 μm, 10 to 20 μm, 20 to 30 μm, 30 to 40 μm, and 40 to 50 μm can be formed. A combination of graphite or carbon fiber reinforced graphite (composite graphite) as a slide-contact surface of the ball bearing or the roller bearing, and high-strength ceramics such as silicon nitride and Sialon which have an excellent wear resistance as the rolling elements is excellent in sliding properties. Especially when sliding contact is conducted in non-lubricated condition, a favorable lubricant film is formed on the slide-contact surface. The friction coefficient is not more than 0.2 and extremely small, considering that the friction coefficient between high-strength ceramics is 1.0 or more. Moreover, the sliding properties of the above-mentioned materials do not deteriorate at a high temperature of 1000° C. or less, so that an excellent rotational performance can be obtained even at high temperature.

Furthermore, since any of the above-mentioned materials is excellent in corrosion resistance, the rotational properties do not deteriorate at all even in a special environment such as the molten metal and the reaction gas atmosphere.

Ceramics, excellent in corrosion resistance against molten metal, are used for slide-contact portions of a roll shaft and a bearing so that an increase in wear can be prevented due to corrosion. Additionally, with sliding in planar contact, when one element is formed of a high-strength high-hardness ceramic and the other is formed of a material having solid lubrication capability, the wearing coefficient can be made as small as 0.1 or less, and the galling resistance critical facial pressure can be made as large as 50 kgf/cm$^2$ or more. This is a solid lubrication effect. With this function, cracking of the ceramic due to sticking, galling and so on can be prevented. Moreover, with the above-mentioned combination, slight wear of the solid lubricant member at an early stage serves to eliminate partial contact due to unevenness and eccentricity caused at the time of machining. Thus, the slide contact surfaces uniformly contact each other so that local friction can be prevented, and a well-lubricated sliding can be effected. Furthermore, the high-strength high-hardness ceramic seldom wears, and the ceramic can maintain an almost permanent smooth slide-contact surface. Therefore, the friction wearing depth of the solid lubricant material can be made ⅒ or less than that of a conventional metal to metal combination.

According to the present invention, by virtue of the combination of materials, the slide-contact surface of the bearing of the sink roll has a semicircular or circular shape, and its entire periphery is formed of the ceramic or the solid lubricant member. As a result, the solid lubricant member can be prevented from being damaged by hard intermetallic compounds generated due to a reaction between the metal of the heat resistant steel and the molten metal. In order to make adhesion of these intermetallic compounds as small as possible, the slide-contact surfaces of the roll shaft and the bearing are designed to slide in planar contact, thereby increasing the durability.

As described above, those portions of the slide bearing structure which slide on each other are formed of a combination of a sintered ceramic member and a solid lubricant member.

Sialon is the most favorable as the high-strength sintered ceramic member. However, other materials such as SiC, $Si_3N_4$, $Al_2O_3$ and $ZrO_2$ can be also used. Since aluminum and zinc are used as a molten metal, materials having corrosion resistance against these molten metals should preferably be employed. However, a material having a tensile strength of 200 MPa or more and a Vickers hardness of 10 GPa or more is preferable, and a carbide, a nitride, an oxide, a boride, a nitric oxide and a sintered composite ceramic member containing them as primary components are used.

When a roll shaft is made of a metal, a cylindrical ceramic member is closely fitted on the roll shaft. At this time, a metallic material of a low yield point which is elasto-plastically deformed by a force less than the rupture strength of the ceramic must be interposed between the metallic roll shaft and the cylindrical ceramic member. Further, when the sintered ceramic member has a large size, it is divided in the axial direction and a plurality of sections of the ceramic are attached to thereby improve the reliability with respect to various kinds of stress.

With regard to the bearing supporting the sink roll, when the ceramic or the solid lubricant member attached to the roll has a large size, the semicircular or circular member is divided in the axial direction and a plurality of sections of the bearing are secured on the inner periphery of the metallic base of the bearing. As a securing method, it is effective, for example, to insert the plurality of sections into dovetail grooves formed in the inner peripheral surface of the metallic base of the bearing and to securely fix the sections in the dovetail grooves by pressing from the outer periphery of the metallic base by bolts. Preferably, the plurality of sections are pressed by the bolts through thin metallic plates.

The material having solid lubrication properties should preferably be a non-metal. A sintered member of a ceramic containing 1 to 70 volume % a material excellent in solid lubrication such as graphite powder, carbon fibers, $MoS_2$, $WS_2$, BN or the like which is dispersed in the sintered member, or especially a sintered member of silicon carbide containing 1 to 70 weight parts (preferably, 15 to 40 weight %) graphite powder having an average grain size of 50 μm or less or carbon fibers having a diameter of 150 μm or less which is dispersed in the sintered member, a similar sintered member with a combination of silicon nitride and BN, or a member made of BN or graphite alone may also be used.

A carbon fiber reinforced composite graphite material in which carbon fibers are dispersed in graphite is the most excellent because it has a high strength. Especially, the material which has a three-point bending strength of 10 kg/mm² or more in a direction of the carbon fibers, or, preferably, a material which has a strength as high as 20 to 60 kg/mm² may be used. When the carbon fibers are directed in substantially one direction such that the longitudinal direction intersects with a direction in which they receive the load (or the contact surface), more excellent sliding performance can be obtained, and this arrangement is favorable because they can sustain a high load. Depending on a purpose, carbon fibers can be directed in such a manner that the longitudinal direction extends in a direction in which they receive the load or the contact surface. As the carbon fibers, long fibers having a diameter of 10 μm or less (preferably, 0.1 μm to 10 μm) are used, and either one-direction arrangement or mesh arrangement can be employed. The content of the carbon fibers is 10 to 80 volume %, or preferably, 20 to 60 volume %. Graphite serves as a solid lubricant.

It is preferable to provide the solid lubricant member all over the semicircular or circular sliding surface. However, providing it all over the semicircular surface is slightly difficult from a structural point of view, and consequently, a semicircular member divided in the axial direction is provided.

In this invention, when the ceramic is attached on the outer periphery of the metallic roll shaft, the buffer material which can be elasto-plastically deformed by a force less than the rupture strength of the ceramic is interposed between the ceramic and the metallic roll shaft before they are closely fitted with each other. Therefore, even if the common machining difference of the metallic roll shaft and the ceramic sleeve is large, strain generated due to a thermal expansion difference of these two members in the molten metal bath is absorbed by elasto-plastic deformation of the buffer material, so that the ceramic can be securely fixed on the metallic roll shaft without any damages of the ceramic such as cracking, breakage and so on. Also, since residual stress of the ceramic caused by fitting does not exceed the yield stress of the buffer material during the operation, the margin with respect to the load during the operation is high. It should be noted that similar effects can be expected from the above-described structure with respect to an impact load, and that it is suitable as a structure for attaching a ceramic on a roll shaft.

Preferably, the intermediate material for absorbing stress is a metal having a low yield point which can be elasto-plastically deformed by a force less than the rupture strength of the ceramic and for an elasto-plastic deformation amount which is 20% or less, and especially, Ti, Au, Ag, Al, Pd, Cu, Ni or an alloy containing one of them as a primary component is used, and also, austenitic stainless steel and ferritic stainless steel having a Vickers hardness (Hv) of 200 or less are employed. Such a buffer material is inserted in the entire surfaces where the roll shaft and the ceramic are contacted with each other, or the buffer material cut into elongated pieces are partially inserted, and a residual space to which the buffer material can be deformed to move is defined in the gap between the roll shaft and the ceramic. More preferably, the buffer material area has the residual space even at a temperature when it is used.

Moreover, the surface of the buffer material can be formed to be uneven by grooves or holes to facilitate the elasto-plastic deformation. The buffer material may be of a linear material or a thin pipe spirally wounded on the outer periphery of the roll shaft, a corrugated plate material, or a honeycomb flat plate material.

A grooved sleeve having a large number of longitudinal grooves or lateral grooves in the outer peripheral surface or the inner peripheral surface or both surfaces of the sleeve can be employed. By using a thin pipe having an outer diameter of 5 mm or less which is made of the above-mentioned stainless steel, elasto-plastic deformation can be facilitated, and a large deformation can be effected. Additionally, since the thin pipe still has elasticity after the deformation, the pipe can be securely attached in a favorable condition. In this case, a pipe material having strength greater than that of a solid material as the buffer material can be used.

Furthermore, projections having a shape which is easily elasto-plastically deformed can be formed on the outer surface of the buffer material, the projections opposing to the ceramic sleeve. The projections may have any of an annular shape, a spiral shape, and a bar-like shape.

The buffer material may be metalized on the surface of the roll shaft, and this metalization can be performed by a method such as thermal spraying, welding and plating. Preferably, the surface of this layer is formed so as to be uneven.

The cylindrical sintered ceramic member may, in accordance with the present invention, be shrinkage-fitted on the roll shaft so that the roll shaft and the sintered ceramic member are closely fitted with each other, or the ceramic member may be formed over an entire outer periphery of the roll shaft by a thermal spraying method or a chemical vapor deposition method (CVD).

Preferably, the cylindrical ceramic member attached on the roll shaft according to the present invention is pressed and fixed by metallic pressing plates and the springs from the end surface of the roll shaft, with the springs being, for example, coil springs made of a heat resistant alloy, especially Cr steel, Ni—Cr steel, Cr—Ni—Co alloy system or such material containing proper amounts of W, Mo, Ti, Si, Nb and so forth is used as the heat resistant alloy. The ceramic is secured in an axial direction through a thermal expansion absorbing material, and the thermal expansion absorbing material has a thermal expansion coefficient greater than that of the roll shaft.

In the hot dipping apparatus of the present invention, the sink roll, the guide rolls, their bearings, the frame for sustaining the bearings etc. are metallic members in contact with molten metal, and the above-mentioned heat resistant steel having a chromium content of 20% or more or Ni alloy or Co-base alloy is used for these members. Particularly, the heat resistant steel is preferred for the following reasons.

Carbon is used to obtain a required strength, and the content is not less than 0.15% and not greater than 0.3%. If the carbon content is less than 0.15%, a sufficient strength can not be obtained, and if the carbon content exceeds 0.3%, no advantageous effects can be obtained.

Si and Mn are indispensable for deoxidation and desulfuration, and the content of Si and Mn must be 2% or less to enable a production of castings. Preferably, the content of Si and Mn is in a range of 0.1 to 1%.

Not less than 20% content of Cr is required for reducing reaction with molten metal and decreasing formation of hard intermetallic compounds. However, if the content of Cr exceeds 30%, a problem of brittleness will arise. Therefore, the content is set at 30% or less and, preferably, the content of Cr should be in a range of 22 to 26%.

Not less than 10% content of Ni is required for enhancing the machinability at high temperature and increasing the toughness. However, if the content of Ni exceeds 20%, no substantial advantageous effects can be obtained. Therefore, the content is set at 20% or less and, preferably, the content of Ni should be in a range of 12 to 18%.

Also, one or more of Ti, Nb, W, V, Zr and Al can be added to enhance the strength, with the content of each being 1% or less.

Although either forging quality steel or cast steel can be used as base metals of the roll and the bearing, cast steel is preferred for the roll. Also, either forging quality steel or cast steel can be used for the frame for sustaining the roll and bearing, but cast steel is preferred from a manufacturing point of view. The above-described steel contains eutectic carbide, is of an entire austenitic structure, and has a more excellent high-temperature strength.

Moreover, ferritic steel consisting essentially of not more than 0.15% C, not more than 1% Si, not more than 1% Mn, 10 to 15% Cr, not more than 6% Ni, and the balance of Fe, or low alloy steel containing 0.1 to 0.34% C, not more than 1% Si, not more than 1.5% Mn, 0.5 to 3% Cr, and not more than 2% Ni may be used.

In the present invention, the ceramic material excellent with respect to corrosion resistance, wear resistance and sliding properties, can be highly reliably provided on the contact portion of the roll bearing, so that the roll bearing exhibits a long service life with respect to durability in the hot dipping bath, and that it is possible to carry out a hot dipping operation ten times longer than with a roll bearing made of the conventional metal. Thus, the present invention reduces the frequency of replacement of the roll bearing, improves the productivity by enabling continuous operation over a greater time period and reduces the production of defective products.

DETAILED DESCRIPTION

Figure 1:
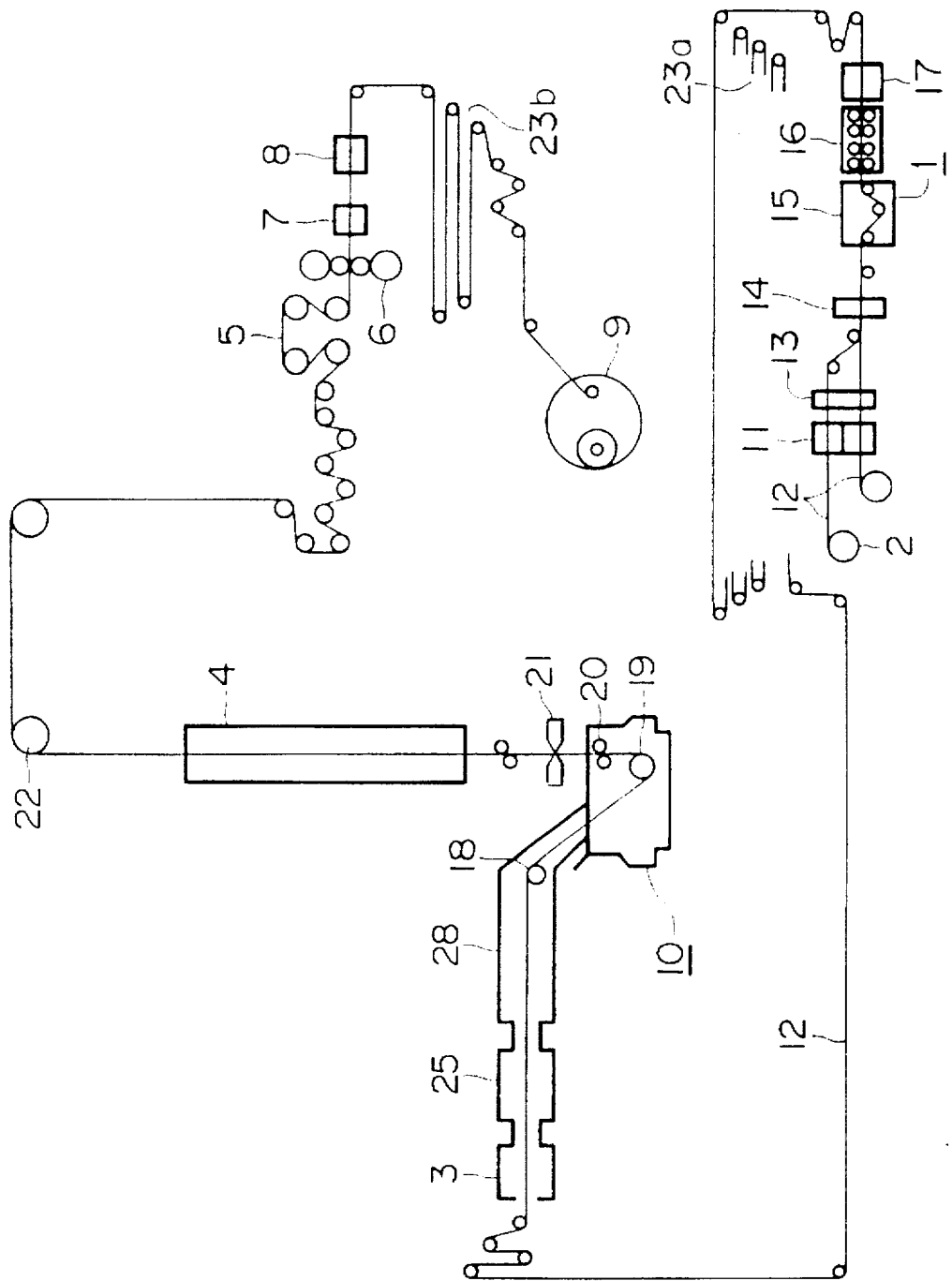
FIG. 1 is a schematic view of a continuous molten zinc hot dipping apparatus according to the present invention.

Referring now to the drawings wherein like reference numerals are used throughout the various views to designate like parts and, more particularly, to FIG. 1, according to this figure, in a first embodiment, in a continuous molten zinc hot dipping apparatus of the present invention, a steel strip 12, representing a material to be plated, is rolled on a pay-off reel 2 and fed through a leveler 11, a shearing machine 13 and a welder 14. The steel strip 12 is delivered through an electrolytic cleaning tank 15, a scraper 16, a rinsing tank 17 and a looper 23a to a non-oxidation annealing furnace 3. After the steel strip 12 is annealed, it is passed through a reducing furnace 25 and a cooling zone 28, and plated in the hot dipping apparatus 10. The strip 12 which has been immersion-plated while passing through the apparatus 10 is moved vertically upwardly at high speed and passed through a surface controller 4. The strip 12 is then delivered through a bridle roll device 5, a skin pass mill 6, a tension leveler 7, a chemical conversion treatment device 8, etc., and wound on a tension reel 9 by a looper 23b. Tension applied to the strip 12 is controlled by the roll device 5 and a tension bridle (not shown).

This tension is controlled so as to be constant in accordance with an amplitude of oscillation measured by an oscillation detector installed in a delivery line of the strip 12 immediately after wiping nozzles 21. An oscillation detector is provided at each treatment stage of the tension bridle.

Figure 2:
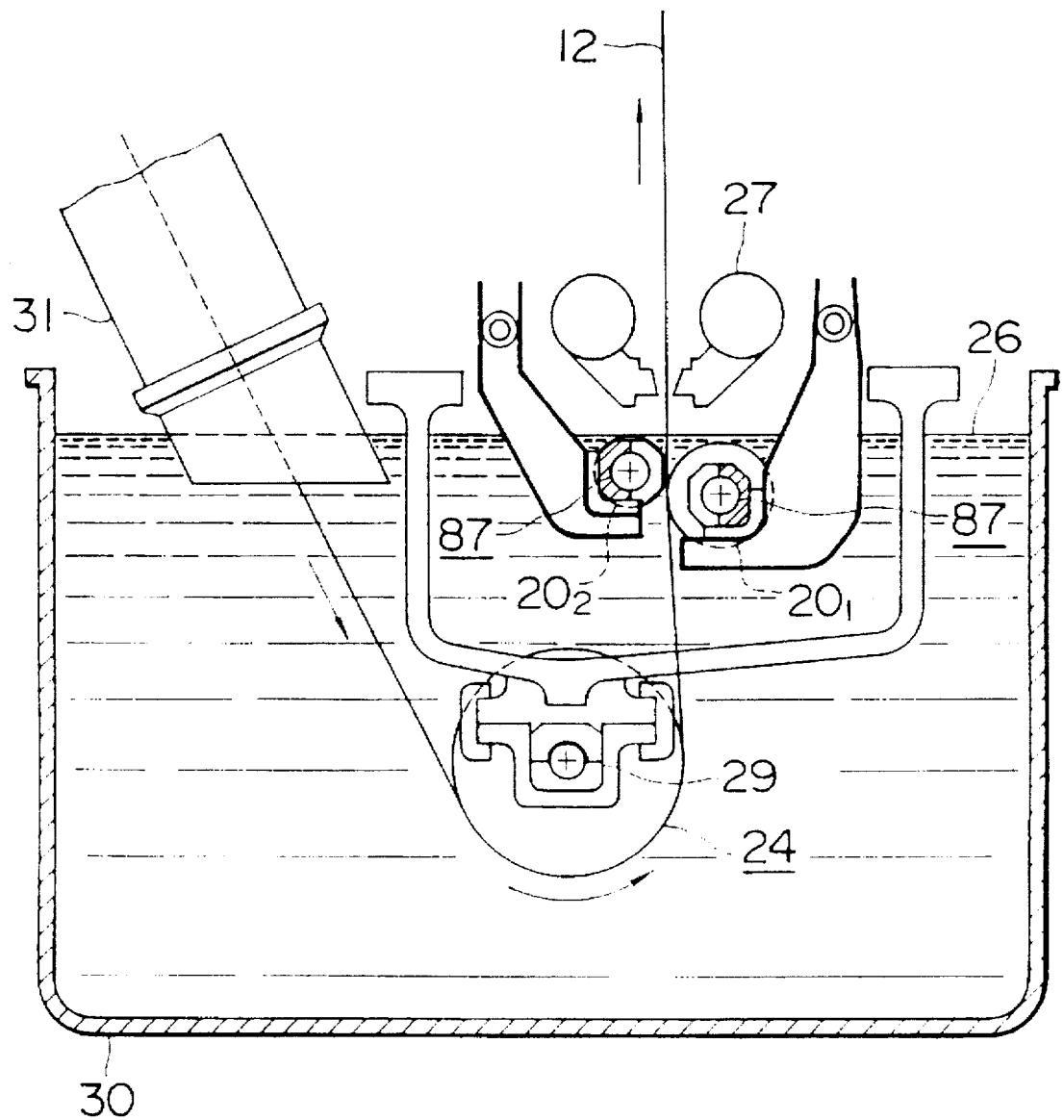
FIG. 2 is a cross-sectional view, enlarged scale, of a zinc hot dipping tank of the zinc hot dipping apparatus of FIG. 1, showing locations of a sink roll and guide rolls.

As shown in FIG. 2, the advancing direction of the steel strip 12, supplied through a snout 31, is changed in a hot dipping tank 30 by a sink roll device 24, and the movement of the strip 12 is stabilized by a support roll device 20 with the strip 12 being moved at a speed as high as 50 to 100 m/minute.

Gas at a high-speed is injected toward the strip 12 drawn from a hot dipping bath 26 by the wiping nozzles 27 installed on both sides of the strip 12. The amount of plating is controlled by controlling a pressure of the gas and an injection angle of the gas.

The guide roll device 20, a roll 19 of the sink roll device 24 and a roll bearing shell 29 which are used in the hot dipping bath, are lubricated by molten metal, and, consequently, the roll bearing device shell 29 is a slide bearing.

As apparent from FIG. 2, wear conditions of a conventional sink roll bearing occurs in a direction indicated by the arrows, that is, in a direction of a vector of force generated when the steel strip 12 is bent by the sink roll device 24.

Figure 3:
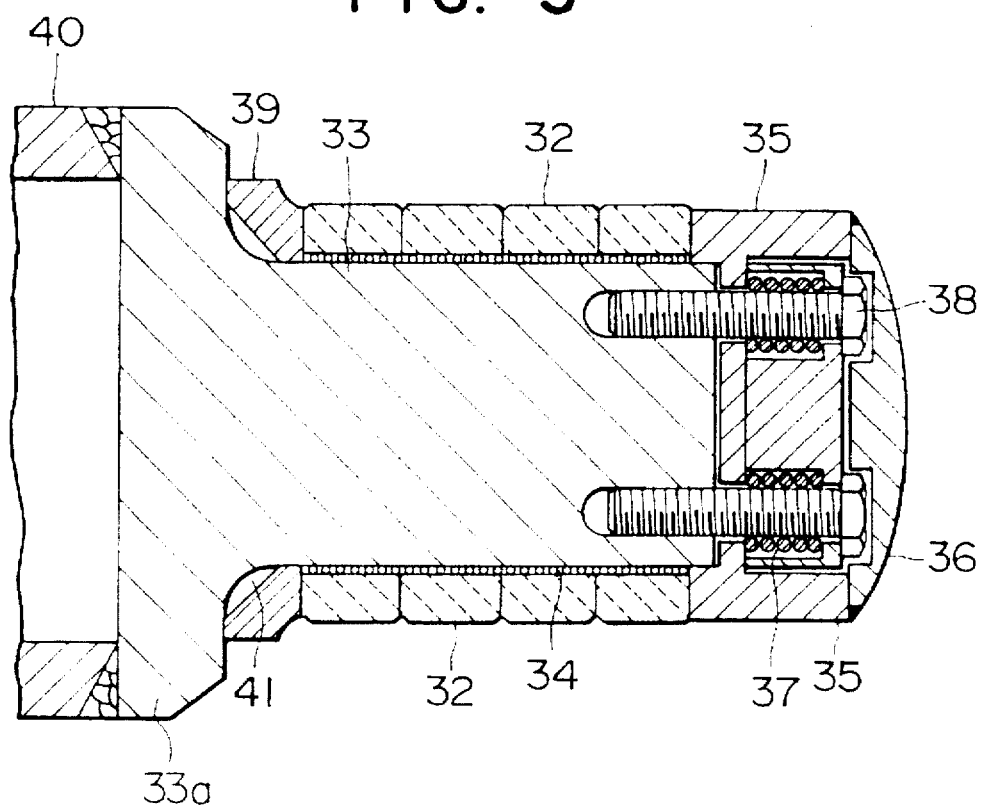
FIG. 3 is a cross-sectional view of a portion of a sink roll shaft of the present invention.

The roll 19 of the sink roll device of the present invention includes a roll shaft 33, with Sialon ceramic, exhibiting an excellent corrosion resistance against molten metal and having a high-strength high-hardness property, being selected for forming a cylindrical ceramic bearing surface 32 divided into four sections and being attached on a roll shaft 33. Sialon ceramic is expressed by $Si_{6-z}Al_zO_zN_{8-z}$, where Z is variable within the range of 0–4.2, and is generally referred to as β-sialon. In the embodiment of FIG. 3, Sialon powder having a composition with Z=0.5 is used. After adding a small amount of binder to the Sialon powder, and the powder is wet-kneaded in methanol followed by granulating by a conventional spray-drying method. Then, conventional cold hydrostatic pressing is conducted to form the four cylindrical sections having an outer diameter of 210 mm, an inner diameter of 145 mm and a length of 50 mm. The sintering temperature is 1750° C., and sintering is performed in the atmosphere of nitrogen. Further, the sintered cylindrical sections are finished to have an outer diameter of 150 mm, an inner diameter of 118 mm and a length of 40 mm. An outer surface roughness of an outer-diameter sliding surface $R_{max}$ is equal to 0.8 μm.

The roll shaft 33 and a body 40 forming a cylindrical roll are made of stainless steel which is relatively corrosion resistant and is finished to have an outer diameter of 122.18 mm. As an intermediate buffer material 34, a pipe of JIS SUS316 stainless steel, previously subjected to a tempering treatment, and copper wire are alternately wound on the roll shaft 33. FIG. 3 illustrates the condition in which the stainless steel and copper wire are wound on the roll shaft 33. Next, the cylindrical sintered Sialon cylindrical sections 32 are fitted on the roll shaft 33 provided with the copper wire, and as shown in FIG. 3, the ceramic cylindrical sections 32 are pressed and fixed in the axial direction by a pressing member 35, a cap 36, springs 37 of an Inconel alloy, and bolt screws 38 with a force of about 600 kgf, so that molten zinc is prevented from entering between the ceramic cylindrical sections 32 and the roll shaft 33. A proximal end portion of the roll shaft 33 being connected to the roll body 40 has a gradually varying diameter so as to prevent stress concentration, and, consequently, the cylindrical ceramic section 32 can not be closely fitted on the proximal end portion of the roll shaft 33. Therefore, a space 41 is formed at the proximal end portion or a bent portion of the roll shaft 33, and a metallic ring 39 is provided so that the ceramic cylindrical section 32 will be stably retained with respect to the roll body 40. Outer peripheral angular portions of the cylindrical ceramic sections 32 are rounded to prevent chipping and, preferably, inner peripheral angular portions can be likewise rounded.

The cylindrical roll body 40 is made of the same material as the roll shaft 33 and is connected to a flange 33a, which constitutes a part of the roll body, of the roll shaft 33 by welding. With this arrangement, it is possible to decrease the weight of the roll sustained by the steel strip 12 to be rolled, thereby enabling rotation with less oscillation and high-speed movement of the steel strip 12. Recesses may be formed in the surface of the roll body 40 so as to increase the friction between the roll body 40 and the steel strip 12.

The pipe, of JIS SUS316 stainless steel having an outer diameter of 2.00 mm and an inner diameter of 1.0 mm, is wound, at pitches of 4 mm, on the roll shaft 33 having an outer diameter of 120.0 mm, and spot welding secures both ends of the pipe on the roll shaft 33. Also, the copper wire, having the same diameter as the pipe, is wound between adjacent segments of the pipe. The outer diameter of the roll shaft 33 on which the pipe is wound is 124.0 mm, and a Sialon sleeve formed by the cylindrical ceramic sections has an inner diameter of 124.54 mm and an outer diameter of 165 mm and is fitted on the roll shaft 33. In this case, the pipe made of JIS SUS316 stainless steel in the molten zinc bath at 460° C. has an elasto-plastic deformation amount of about 100 μm, and a pressure generated is about 1.6 kgf/mm². Since the generated pressure is about one-third of the allowable pressure $P_{max}$ of the Sialon sleeve which is 5 kgf/mm², problems such as cracking are avoided. Also, the pipe made of JIS SUS316 stainless steel has high elasticity at the normal use temperature. Thus, it has been found that a stable fitting can be obtained. The copper wire is employed to enhance the thermal conductivity.

The cylindrical hollow roll body in this embodiment is formed of cast steel consisting essentially of, by weight, 0.17% C, 0.63% Si, 1.55% Mn, 13.45% Ni, 23.63% Cr and the balance of Fe, which contains eutectic carbide and is of an entire austenitic structure. Any one of the shaft 33, the pressing member 35, the cap 36, the bolts 38 or the ring 39 may be formed of forging quality steel of this material. The cylindrical hollow roll may be manufactured by a boring machining, a centrifugal casting process or an electro-slag melting process.

Figure 4:
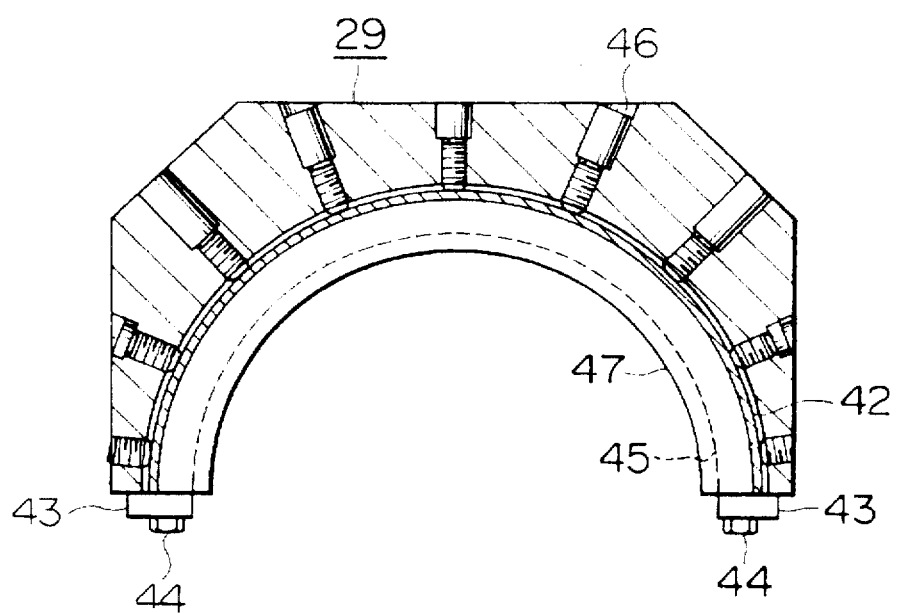
FIG. 4 is a cross-sectional view of a bearing.
Figure 5:
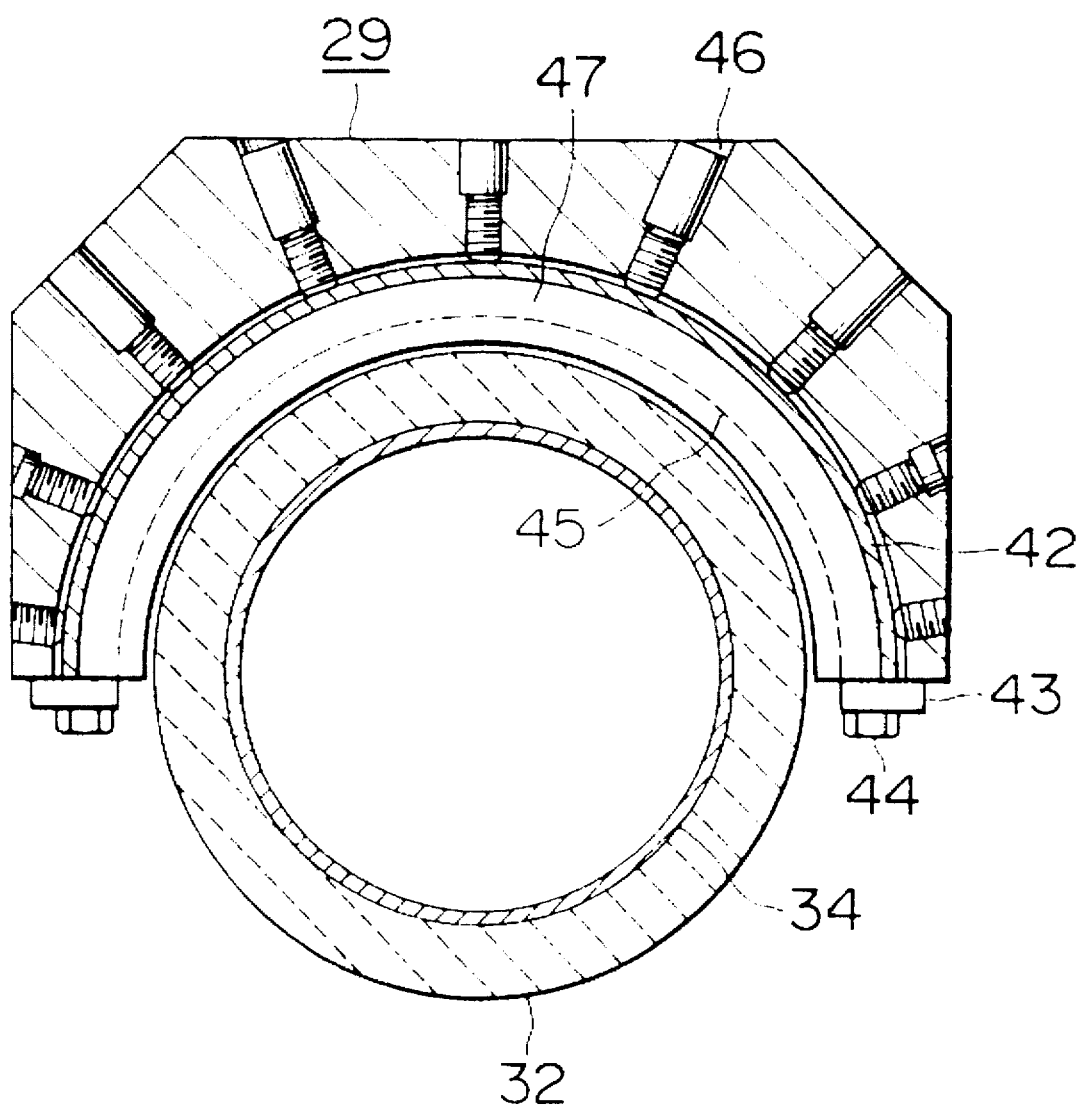
FIG. 5 is a cross-sectional view of a roll shaft accommodated by the bearing of FIG. 4.
Figure 6:
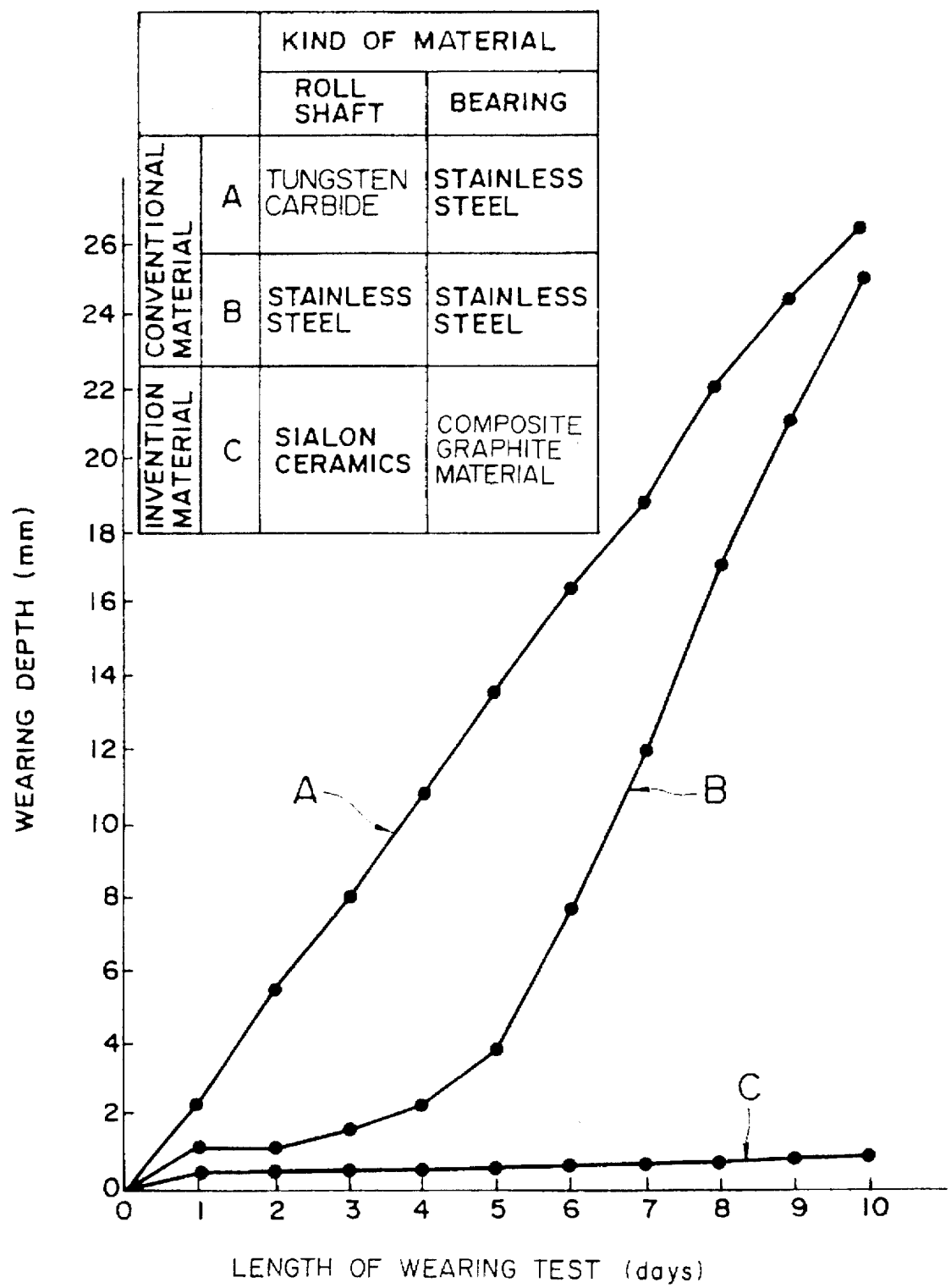
FIG. 6 is a graphical illustration of the relationships between a wearing depth and length of time, in days, of wearing tests.
Figure 7:
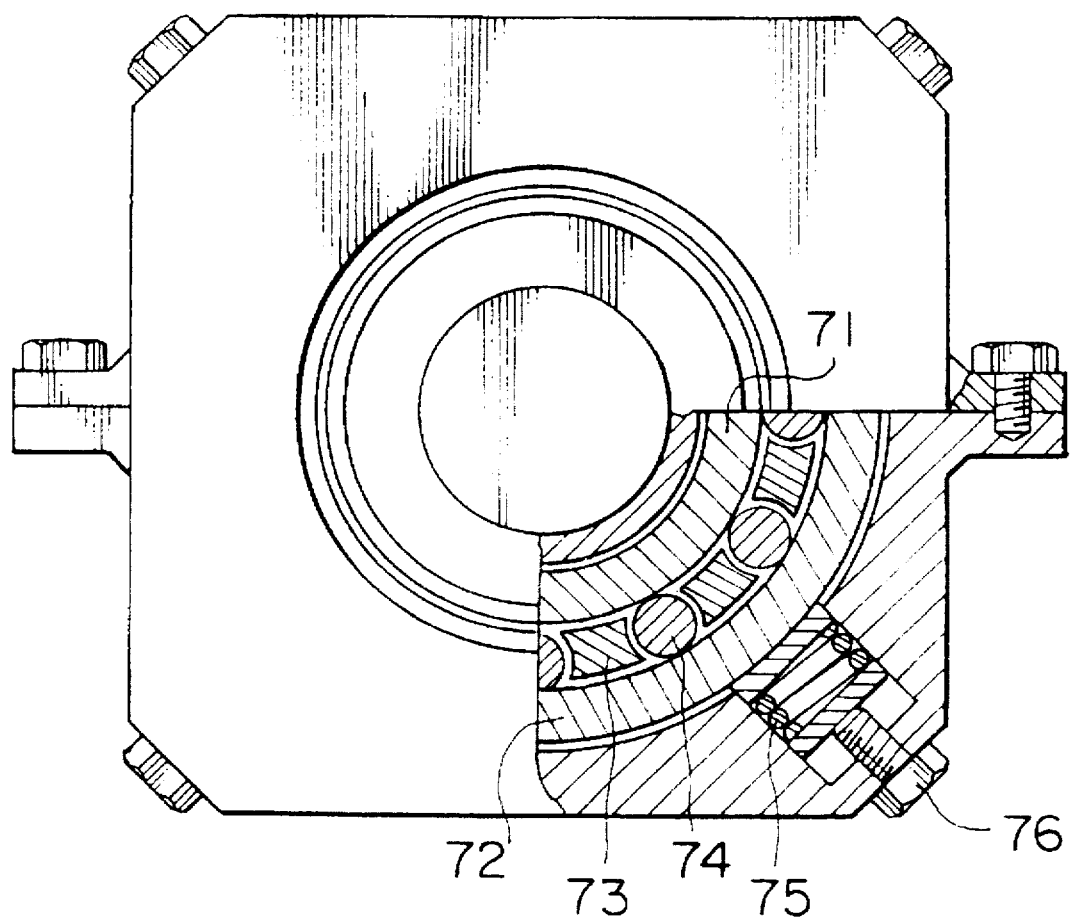
FIG. 7 is a front end elevational view, partly broken away of a roller bearing.

The bearing base 29 of FIG. 4 is fashioned of a stainless steel material and a semicircular member 47, forming a bearing surface, is fashioned of a carbon fiber reinforced composite graphite material and comprises four sections. The semicircular member 47 is attached on an inner peripheral surface of the metallic base 29 of the bearing, with the semicircular member 47 of composite material being excellent in solid lubrication property and corrosion resistance against molten zinc. The carbon fiber reinforced composite graphite material of the bearing member 47 is obtained by sintering the semicircular member 47 in blocks. A three-point bending strength is about 45 kgf/cm². The composite material of the semicircular member 47 is cut, ground and finished so that a cross section perpendicular to the peripheral direction of metallic base 29 is trapezoidal, and a length of a side of the inner peripheral surface is less than a length of a side of the outer peripheral surface. The carbon fibers of the sintered composite graphite material of the semicircular member 47 have a diameter of 1 to 5 µm, and a volume of 50% by weight of carbon fibers are directed in one direction and dispersed in graphite. From the block of the sintered composite graphite material, several types of the semicircular members are cut out in such a manner that longitudinal directions of the carbon fibers of each of the several types are different, the directions being variations from parallel to perpendicular, with respect to a direction of the load acting on the bearing. The bearing base 29 of a stainless steel material is made of forging quality steel having the same composition as the above-described roll, and provided with dovetail grooves 45 having the same cross section as the semicircular member so that the composite graphite of the semicircular members 47 can be attached on the inner peripheral surface of the bearing base 29, and with screw holes 46. More particularly, as shown in FIG. 4, the semicircular members of the composite graphite material 47 are placed in the dovetail grooves 45 and pressed, from rear surfaces of the semicircular members 47, by screw fasteners of stainless steel having the same composition as described above via a semicircular support plate 42 of stainless steel having the same composition as described above. End surfaces of the semicircular members 47 are secured by bolts 44 extending through pressing plates 43 made of substantially the same material. The semicircular members 47 are of four pieces arranged in a series in the axial direction of the bearing base 29. A wearing test was performed in the molten zinc bath with a bearing arrangement of FIG. 5. The temperature of the zinc bath was 450° to 480° C., and a pressing force of the roll bearing was 1300 kgf. As a result, as shown in FIG. 6, wear of the roll bearing after continuous rotation for ten days was not greater than 1 mm and so small that the wear was 1/20 or less of wear of the conventional roll bearing. With regard to the conventional roll bearings, rotation experiments of cylindrical bearings having a different construction from the embodiment described above, wherein the roll shaft had a diameter of 150 mm and a length of 160 mm were conducted. A wear of the roll bearing of the present invention after about thirty days was not changed, and it was experimentally confirmed that the roll bearing of the present invention had an excellent durability. The effects of the present invention were considerably enhanced when the carbon fibers were directed in one direction and the slide-contact surface was machined to be circular, the carbon fibers being directed most vertically in the vicinity of the center of the circumferential length.

With regard to the types of alloys for the sink rolls and the support rolls, the depth of corrosion after immersion in the molten zinc bath at 450° to 480° C. for 50 hours were measured and it was determined that a 12% Cr stainless steel and steels containing about 1% Cr were preferable and, in particular, an alloy No. 8 containing 23% Cr and 14% Ni presented excellent results.

The guide rolls are pressed against the steel sheet 12 from both sides of the steel sheet 12 in opposite directions and are located at positions displaced with respect to each other.

As shown in FIG. 2, a roll body of lower guide roll 20₁ of the guide rolls in the tank 30 has a larger diameter than that of the upper guide roll 20₂, and diameters of bearings of the guide rolls 20₁, 20₂ are proportional to the respective diameters of the guide rolls 20₁, 20₂. Both of the guide rolls 20₁, 20₂ are rotated only by movement of the steel strip 12.

Figure 8:
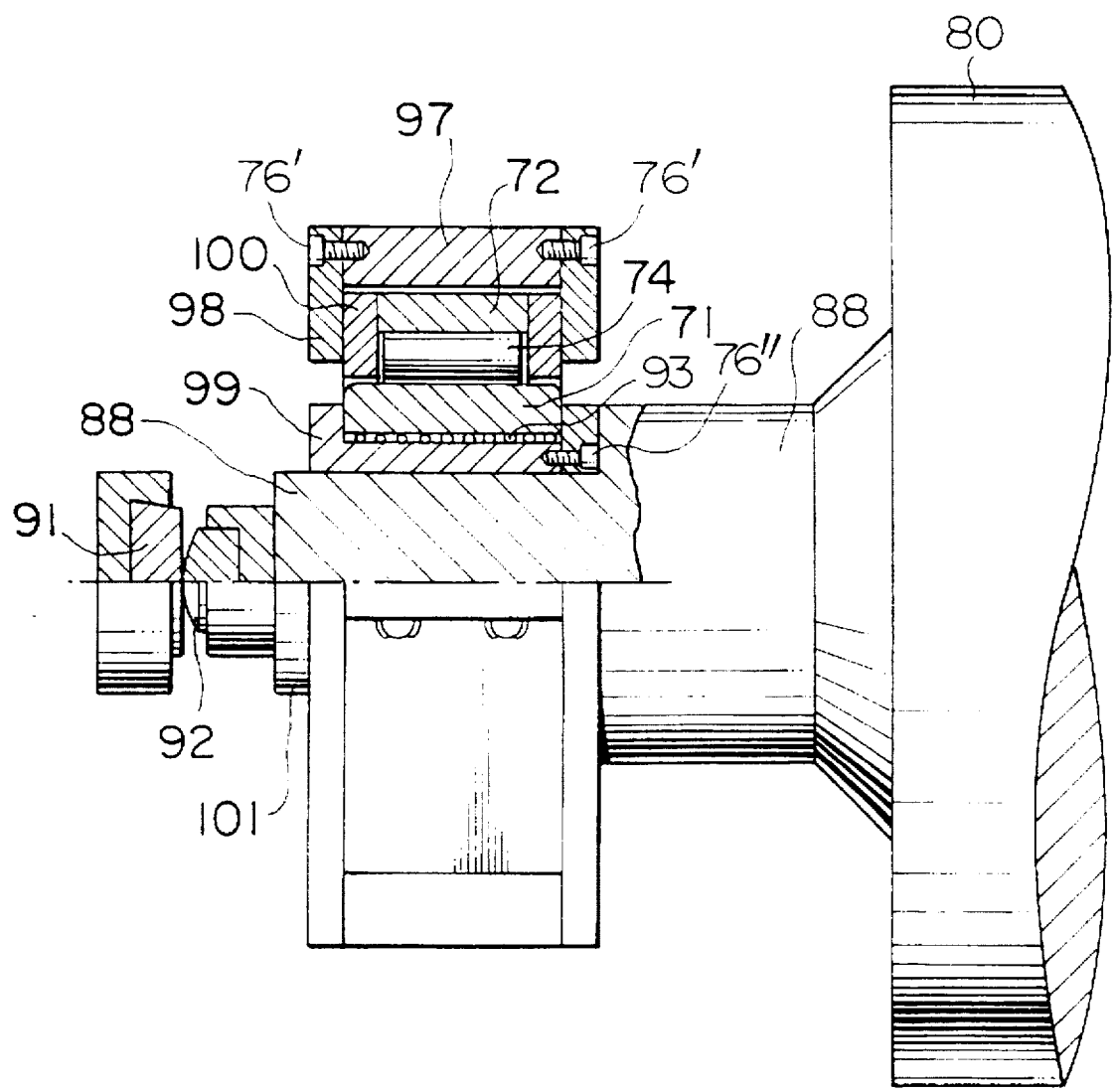
FIG. 8 is a side elevational view, partly broken away showing locations of a roller bearing and a guide roll shaft.

In the roller bearing of FIG. 8, an inner ring 71, an outer ring 72, a thrust block 91 and retainers 73 are provided, with the rings 71, 72, thrust block 91 and retainers 73 forming the roller bearing, and being made of the same carbon fiber reinforced composite graphite material described above, wherein the long carbon fibers are dispersed in one direction and extend in a direction intersecting the rotating or slide-contact surface. Roller elements 74 and a thrust plate 92 are formed of the same sintered Sialon members as described above. Any one of or all of an outer ring holder 97, side plates 98, an inner ring holder 99, a guide roll 80, guide roll shaft 88, and springs 75 may be fashioned of the same material as the sink roll described above. A stress buffer material 93 and bolts 76, 76' are of a JIS SUS316 stainless steel pipe and JIS SUS316 stainless steel, respectively. As shown most clearly in FIG. 8, the inner ring 71 is closely fitted on the inner ring holder 99 and secured on the roll shaft 88 by the bolts 76". Side walls 100, in contact with the rolling elements 74, of the roller bearing are fastened by the bolts 76' through the side plates 98 and are securely fixed.

The sink roll and guide rolls described above are attached in the molten zinc hot dipping apparatus. When a steel strip 12 having a thickness of 0.8 mm is moved at 90 m/minute, layers of zinc plating of 100 g/m² are formed on both surfaces of the steel strip 12, with the operation being continuously carried out for ten days. The guide rolls 20₁, 20₂ were pressed against the steel strip 12 in opposite directions to each other, and rotated only by movement of the steel strip 12 without exerting rotational torque on the guide rolls 20₁, 20₂ from the outside, so as to decrease oscillation of the steel strip 12.

Figure 9:
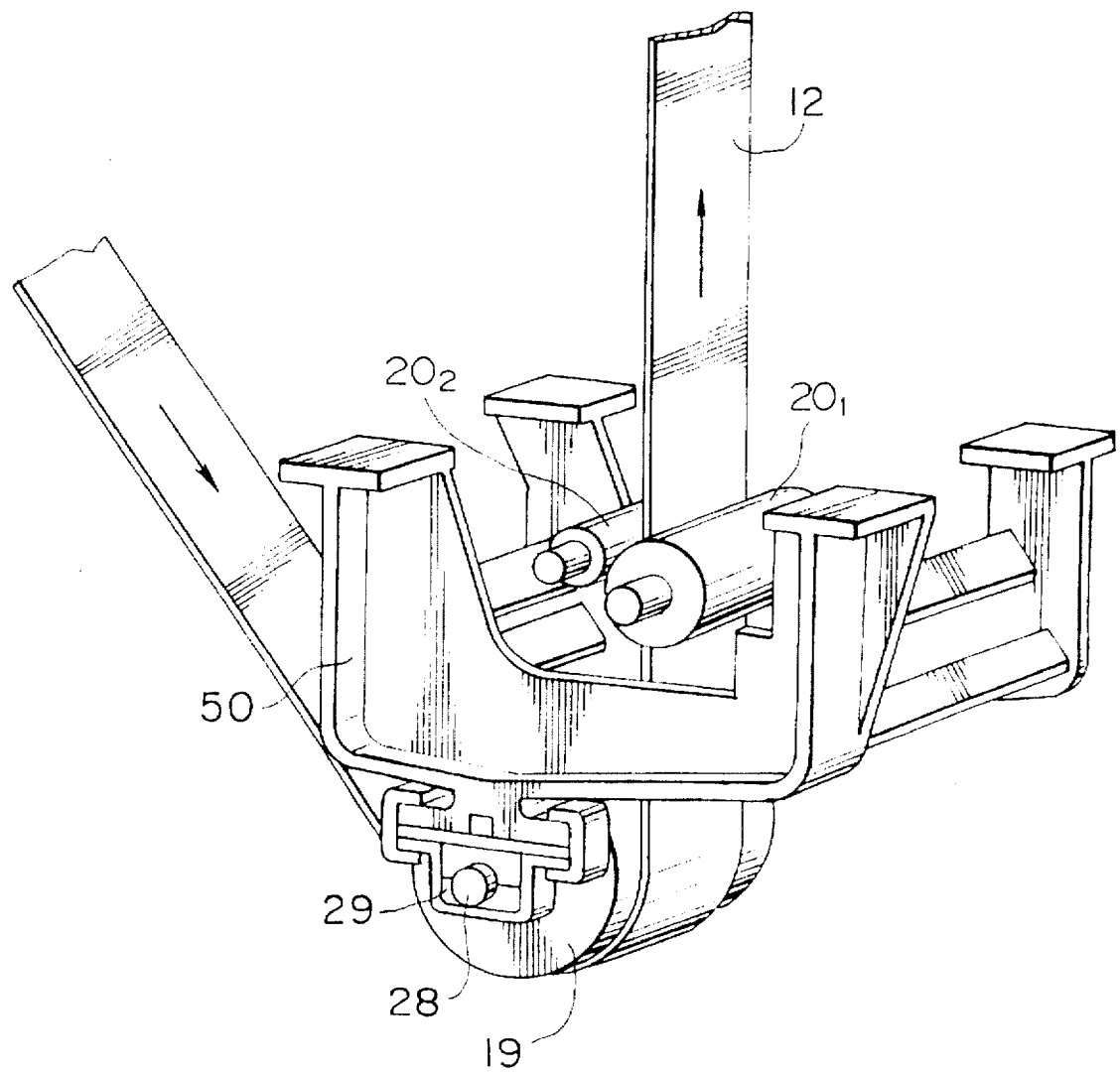
FIG. 9 is a perspective view of a sink roll and a bearing in a hot dipping bath installed on a frame.

FIG. 9 shows clearly the location of the sink roll 19 in the hot dipping apparatus, a frame 50 for supporting a bearing 29, and the guide rolls 20₁, 20₂ for guiding the steel strip 12.

In FIG. 9, the sink roll 19 in the hot dipping tank, the guide rolls 20₁, 20₂, the frame 50, and bearings for the sink roll 19 and guide rolls 20₁, 20₂ are all made of the stainless steel of the sink roll 19. The guide rolls 20₁, 20₂ are made of forged quality steel and the frame 50 is a casting containing eutectic carbide and having an entire austenitic structure.

The amount of zinc plating was set at 40 g/m² or 30 g/m², and the steel strips 12 were continuously produced for a time period one week, ten days and twenty days, to thereby manufacture a new product in each time period. Minimal wear of the roll shafts was experienced and the steel strip 12 only slightly oscillated, so that it was possible to obtain a steel strip 12 plated with zinc layers having a substantially uniform thickness. Fluctuation of the tension of the steel strip 12 at this time and deviation of the gas injection condition were extremely small, and not more than about 10%. Moreover, fluctuation of the amount of plating per unit area was between 3 to 4%.

With a bearing for a sink roll having a small roll shaft diameter of 50 mm and a sliding portion length of 70 mm, a wearing test similar to the above-described test was performed. A carbon fiber reinforced composite graphite material attached on the outer periphery of a roll shaft and the inner periphery of the bearing was the same material in the first described embodiment, with the bearing having the same construction as the first described embodiment. However, since the roll has a small size, the divided bearing shown of FIG. 3 may be fashioned as an integral cylindrical member. Copper wire and a pipe of JIS SUS316 stainless steel may be used as an intermediate material and fitted in substantially the same manner as in the first described embodiment.

Results of the wearing test were substantially the same as the results obtained with the first described embodiment. With the last described construction, no problems were experienced with respect to fitting of the shaft with respect to the bearing, cracking of the ceramic material etc., and favorable results were obtained.

Continuous zinc plating of the guide rolls 20 was performed in substantially the same manner as in the first described embodiment, with substantially the same results being obtained.

A sink roll shaft 33 of JIS SUS316 stainless steel having an outer diameter of 111.5 mm which had substantially the same structure as that of the first described embodiment was used. An intermediate member comprising a cylindrical member made of JIS SUS316 stainless steel, as the buffer material, which had a thickness of 2 mm and an inner diameter slightly larger than 111.5 mm, and angular projections having a tip angle of 60° and a height of 1 mm which were formed on the outer surface of the cylindrical member at pitches of 6 mm in the peripheral direction, were provided around the roll shaft, and a Sialon sleeve having an outer diameter of 150 mm and an inner diameter of 116 mm was fitted in substantially the same manner as in the first described embodiment. In this case, a shrinkage fitting degree at 460° C. was about 50 µm, a generated stress was 1 kg/mm². Therefore, the allowable stress of the ceramic material was ⅓ of 3 kgf/mm² of $P_{max}$, and it was a favorable value. Concerning this roll shaft, a rotation sliding test was performed in substantially the same manner as in the first described embodiment. The wearing depth of the shaft was substantially the same. The buffer material had a slight corrosion resistance against molten Zn, and, consequently, the last described embodiment was more excellent with respect of damage of the shaft than the first described embodiment. The fitting strength at high temperature was high. Furthermore, a tape, made of pure copper, was wound as an intermediate material 34. Considering a thermal expansion difference at 450° C. of molten zinc plating temperature, a space corresponding to 2% of the volume was formed, and a ceramic member 32 was fitted, with causing a cracking of the ceramic member 32.

Zinc plating of the guide rolls was performed in substantially the same manner as in the first described embodiment and substantially the same results as with the first described embodiment were obtained.

In substantially the same manner as in the first described embodiment, a sintered Sialon member was used for a sink roll, and sintered SiC-graphite members were used for a sleeve and a bearing. This embodiment differs from the first described embodiment in that a pipe of JIS SUS316 stainless steel and pure copper wire were alternately wound over the entire area of that shaft portion of the roll shaft where the sintered ceramic member existed, to such a degree that the pipe and the wire were brought into contact with each other, and the ceramic sleeve was fitted after that. In this case, a gap between the ceramic sleeve and the outer diameter of the roll shaft was partially in linear contact with the copper wire. However, plastic deformation and elastic deformation of the copper wire were induced in the molten zinc hot dipping bath at 450° C., and planar contact was obtained. It was thus confirmed that strong fitting of the ceramic sleeve was obtained without cracking.

The bearing was different from that of the first described only with respect to the material but in all other respects the bearing was the same.

The last-mentioned sintered SiC-graphite composite ceramic member was formed by adding 25 parts by weight of graphite powder having an average grain size of 10 µm to 100 parts by weight of SiC powder having an average grain size of 3 µm, wet-kneading the mixture with a small amount of binder in methanol, drying it, and granulating it by a milling and mixing operation. Subsequently, the ceramic member was pressed by a mechanical press and molded into a disk shape having a thickness of 30 mm and an outer diameter of 100 mm or more, and sintered in vacuum at 2100° C. by hot press method. Further, the sintered ceramic member was ground, cut and finished into four divided semicircular blocks having a trapezoidal cross section. Zn plating was performed in substantially the same manner as in the first described embodiment in other respects. Although slightly inferior to the first described embodiment, substantially the same results were obtained.

The above-described SiC-graphite composite sleeve having the same size was used in place of the Sialon sleeve, and it was closely fitted on a sink roll shaft made of JIS SUS316 stainless steel of the third embodiment according to the method described in construction with the first embodiment. A semicircular sintered Sialon member was used as a bearing, and closely fitted in substantially the same manner as in the first described embodiment. Furthermore, substantially the same guide rolls as in the first described embodiment were prepared, and then, molten Zn plating for a thickness of about 20 µm was effected continuously for ten days in substantially the same manner as described above. As a result, it was found that wear of any of the roll shafts and the bearings was minimum, and that deviation of the zinc plating thickness during this operation was extremely small.

A sink roll and guide rolls comprising the rolls and the roll bearings corresponding to the first described embodiment were used, and continuous plating operation was performed by dipping a steel strip in molten aluminum at 680° C. at high speed. As a result, although the wearing depth of roll bearings made of the conventional steel was about 15 mm after four days, wearing depths of the rolls and the bearings according to this embodiment were about 0.25 mm, and wear was as small as 1/60 of the conventional products. Moreover, when the roll bearing of the invention was used for twelve days without replacement, the wearing depth was not more than 1 mm, thereby confirming the effectiveness of this embodiment.

In order to confirm another effect of the present invention, the roll bearing was removed after twelve days of use, and those regions of four pieces of the composite graphite material which were used for operation were rearranged. After the trial, abnormal wear was not particularly observed, and the wearing depth after use of twelve days was not more than 1 mm and as small as the first time of use. It was found that expensive ceramics can be utilized effectively because the identical carbon fiber composite graphite material can be repeatedly used with substantially the same wear condition if it is used in this manner, and because it can continue to be used if the sliding surfaces of the ceramics are ground after a certain period of time.

Conventionally, two identical apparatus containing molten zinc and aluminum have been alternately used substantially once a week because sink rolls wear considerably. In this embodiment, however, the operation can be performed by an individual apparatus. Moreover, wear of the roll is extremely small, so that the time of replacement can be considerably increased as compared with conventional constructions, and, for example, the replacement may be conducted every twenty days or more or every month. Additionally, the looper 23 may be eliminated.

Figure 10:
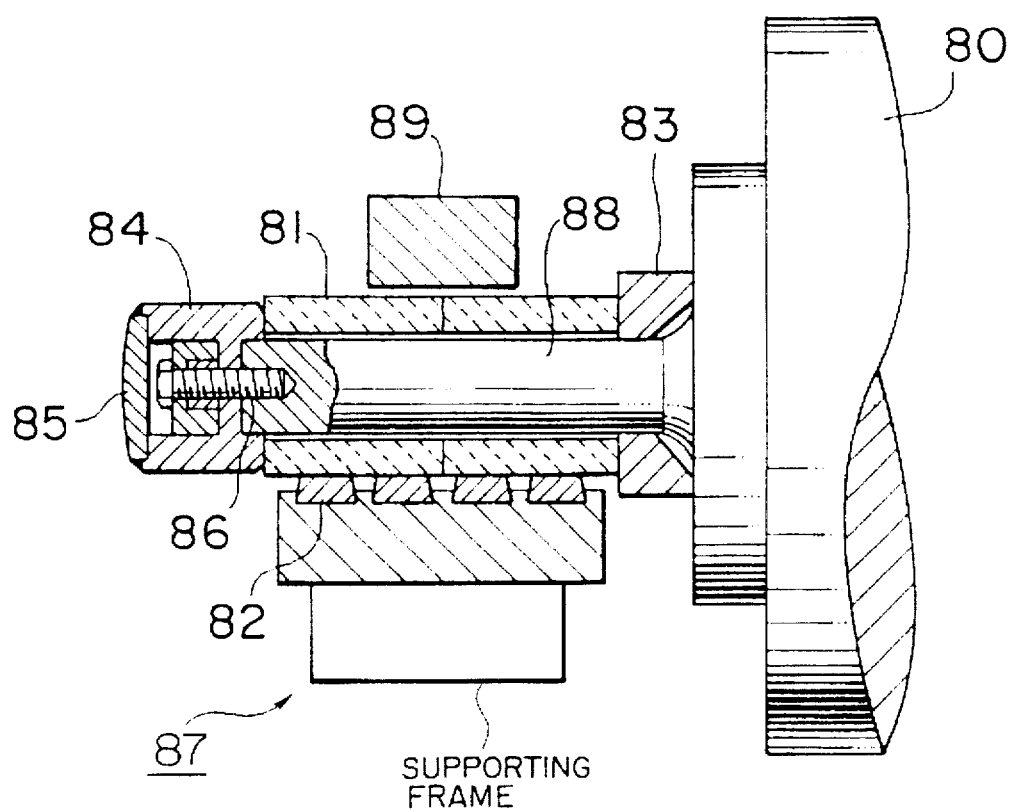
FIG. 10 is a cross-sectional view of a guide roll accommodated in a bearing.

In the embodiment of FIG. 10, the guide roll 80 has a larger diameter with a cooperating guide roll (not shown) substantially corresponding to the guide roll of the first described embodiment. As shown in FIG. 2, roll surfaces of guide rolls are pressed against a steel strip 12 from both sides and contact the steel strip 12 in such a manner that their contact surfaces are displaced from each other. Each bearing 87 is provided with four pieces of carbon fibers reinforced composite graphite material having a semicircular shape, as indicated by portions shadowed by oblique lines in FIG. 10, which have substantially the same structure as shown in FIG. 4. Since no force is particularly exerted on the opposite half portion 89 of the bearing 87, it is formed of the above-mentioned metal. Also, two sleeves 81 made of sintered Sialon members, as described above, are closely fitted on a guide roll shaft 88 through a pipe of JIS SUS316 stainless steel and copper wire in substantially the same manner as shown in FIG. 3. A metal ring 83 is interposed between a root (or a proximal end) portion of the roll shaft 88 and a body, and a pressing member 84 is used to fix the shaft by a screw 86 through a spring, with a cap 85 being securely attached by welding. The guide rolls are located below the surface of molten metal, so as to suppress oscillation of the steel strip. Usually, the method of exerting rotational torque on these two guide rolls from the outside is employed, and it can be likewise employed in this embodiment. However, since the shaft sliding efficiency is remarkably high, it is unnecessary to apply the driving force from the outside. Zinc plating was performed in substantially the same manner as in the first described embodiment. It was performed with substantially constant tension in the traveling direction of the steel strip and with substantially constant injection of gas from the gas wiping nozzles 21, and also, there was extremely little oscillation of the steel strip after molten zinc was coated on the steel strip. Since the steel strip after molten zinc hot dipping was moved vertically upwardly for about 5 m and cooled, even slight oscillation of the roll shafts was transmitted to the steel strip. In this embodiment, however, oscillation of the steel strip was caused only slightly during the operation.

Figure 11:
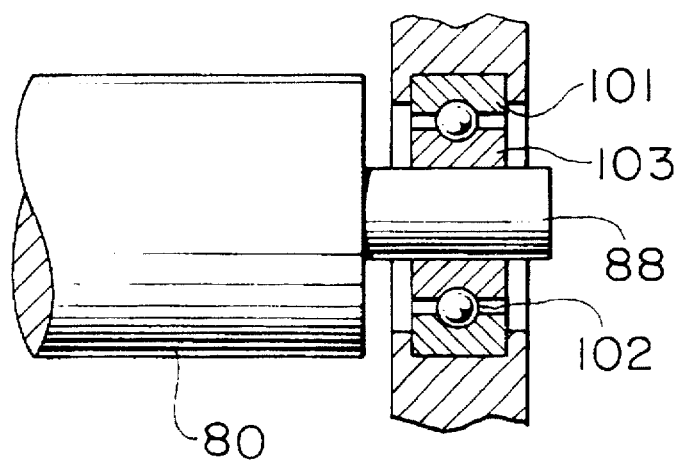
FIG. 11 is a cross-sectional view of a guide roll mounted in a ball bearing.

In the embodiment of FIG. 11, a ball bearing is attached on a guide roll shaft according to the present invention, with an outer ring 101 and an inner ring 103 being made of a carbon fiber composite carbon having substantially the same solid lubrication capability as in the first described embodiment. The carbon fiber reinforced composite carbon material employed in this invention consists essentially of 50 Vol % carbon fibers directed in one direction and the balance of pitch carbon system serving as a matrix material, and is sintered at 2000° C. The composite has a specific gravity of 1.5 g/cm$^3$ or more and a bending strength of 300 MPa or more. Further, the composite is milled to be shaped into a block in which the carbon fibers are directed or oriented to an intersect with the sliding surface, and then, the rolling elements raceway surfaces are finished by lathe machining and cylindrical grinding. As shown in FIG. 8, the inner ring 103 is closely fitted on an inner ring holder through a pipe of JIS SUS316 stainless steel and secured on the roll shaft in substantially the same manner as in the first described embodiment. The bearing structure is substantially the same as in the first described embodiment except that the side plates 98 of the first described embodiment are not provided.

Rolling elements 102 are made of Sialon ceramic which is a high-strength high-hardness ceramic. Sialon ceramics is expressed by $Si_{6-z}Al_zO_zN_{8-z}$, where Z is variable within the range of 0–42, and is generally referred to as β-sialon. In this embodiment, Sialon powder having a composition with Z=0.5 is used. Cold hydrostatic pressing is conducted to form it into spherical green compact members of 20 mm in diameter, and they are sintered in the atmosphere of nitrogen at 1700° C. Thus, spherical sintered Sialon members of 16 mm diameter are obtained.

Further, after the sintered Sialon members are roughly machined, a spherical-surface machining tool is used to obtain the rolling elements 102 made of Sialon which have 15 mm diameter of 0.25 μm sphericity.

This ball bearing was applied to one or both of guide roll bearings in a continuous molten zinc hot dipping apparatus in substantially the same manner as in the first described embodiment, and continuous molten zinc plating was performed in substantially the same manner as in the first described embodiment. A steel strip 12 which is a material to be plated is supplied into the molten zinc tank 10, and directed in a different direction by the sink roll 19. Then, the steel sheet 12 is pressed by the two opposite guide rolls 20, so as to determine the direction of the steel sheet 12 and to prevent bending or oscillation of the steel sheet 12. Moreover, while the steel sheet 12 is being passed between the gas wiping nozzles 21 after leaving the zinc tank 10, excessively attached zinc is blown off by gas injection, thereby controlling the plating amount to have a desired value.

According to this embodiment, rotational irregularity due to friction, rotational deflection due to bearing wear and so forth, which have been problems with conventional slide bearings made of metal or cermet do not occur so that smooth rotational properties can be obtained. Therefore, in substantially the same manner as in the embodiment of FIG. 10, it is unnecessary to drive the guide roll from the outside. Thus, oscillation of the roll can be prevented, and deviation of the plated film thickness can be controlled to be ⅕ or less of the conventional value. Also, the durability of the bearing is confirmed to be not less than ten times of the durability of conventional bearings.

As will be apparent from the above, according to the present invention, an excellent rotational performance can be obtained even in a molten metal bath or in a reaction gas atmosphere where the conventional metallic bearing can not be used. Also, the ceramic bearing made of high-strength ceramic alone exhibits no drawbacks in this invention even in non-lubricated condition or at a high temperature of 1000° C. or less where the conventional bearings can not be used due to galling and so forth, so that an excellent rotational performance can be obtained.

Moreover, according to the invention, especially in the sink roll, the ceramic which is excellent in respect of corrosion resistance, wear resistance and sliding properties is provided on the sliding portion of the roll shaft, and the solid lubricant member is provided on the bearing so as to make the entire outer periphery circular or semicircular. In the guide rolls, ball bearings and roller bearings are used, and a combination of a ceramic and a solid lubricant member is likewise employed. Therefore, wear of the roll bearing in the hot dipping bath is minimal, and the roll bearing has long-term-durability. Moreover, with the present invention, it is possible to carry on operational processing for up to ten times longer than with a roll bearing made of the conventional metal. Thus, the present invention produces effects such as decreasing replacement frequency of the roll bearing, improving the productivity by continuous operation, reducing defective products, and so forth. Moreover, since it is unnecessary to drive the guide rolls from the outside, roll oscillation can be prevented, and it is possible to reduce deviation of the plating thickness.

The present invention can also be applied to slide bearing structures and sliding members for use in chemical plants, furnaces, heaters, space equipment and the like in which high-temperature apparatus must be protected from exposed to oil, and long-term numerous modification can be obtained.

While we have shown and described several embodiments in accordance with the present invention, it is understood that the same is not limited thereto but is susceptible to numerous modification an apparent to one of ordinary skill in the art, and we do not wish to be limited to the details shown and described herein but intend to cover all such modification as an encompassed by the scope of the appended claims.

What is claimed is:

1. A rolling bearing wherein an entire periphery of a contact surface of a bearing supported on a metallic base is formed of a solid lubricant material, a plurality of rolling elements are provided between said contact surface of said bearing and a roll shaft rotated in said bearing, said rolling elements being formed of sintered ceramic material, and wherein intermediate members of a solid lubricant material are interposed between said rolling elements.

2. A roller bearing for a continuous hot dipping apparatus, wherein an entire periphery of a contact surface of a bearing supported on a base fashioned of a heat resistant steel consisting essentially of, by weight, 0.15 to 0.3% C, not more than 2% Si, not more than 2% Mn, 20 to 30% Cr, 10 to 20% Ni, and not less than 50% Fe is formed of a solid lubricant material, cylindrical rolling elements, formed of a sintered ceramic material, are provided between said contact surface of the bearing and a roll shaft rotated in said bearing, and wherein intermediate members of a solid lubricant material are interposed between said rolling elements.

* * * * *